US012688308B2

(12) United States Patent
Sekiya et al.

(10) Patent No.: US 12,688,308 B2
(45) Date of Patent: Jul. 21, 2026

(54) PRIORITY DETERMINATION SYSTEM AND PRIORITY DETERMINATION METHOD

(71) Applicant: Panasonic Automotive Systems Co., Ltd., Kanagawa (JP)

(72) Inventors: Shoichiro Sekiya, Osaka (JP); Yuishi Torisaki, Osaka (JP); Takayoshi Ito, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 75 days.

(21) Appl. No.: 18/969,696

(22) Filed: Dec. 5, 2024

(65) Prior Publication Data

US 2025/0190585 A1 Jun. 12, 2025

(30) Foreign Application Priority Data

Dec. 11, 2023 (JP) ................................ 2023-208617
Aug. 8, 2024 (JP) ................................ 2024-131858

(51) Int. Cl.
*G06F 21/57* (2013.01)

(52) U.S. Cl.
CPC ................................ *G06F 21/577* (2013.01)

(58) Field of Classification Search
CPC ................................................ G06F 21/577
See application file for complete search history.

(56) References Cited

U.S. PATENT DOCUMENTS

| | | | | |
|---|---|---|---|---|
| 10,984,110 | B2 * | 4/2021 | Eacmen, III | G06F 21/572 |
| 11,699,191 | B2 * | 7/2023 | Wang | G06Q 40/08 705/4 |
| 11,930,031 | B2 * | 3/2024 | Smith | H04L 63/102 |
| 11,973,790 | B2 * | 4/2024 | Klein | H04L 63/1433 |

(Continued)

FOREIGN PATENT DOCUMENTS

| | | |
|---|---|---|
| JP | 2013-145499 | 7/2013 |
| JP | 2019-212143 | 12/2019 |

(Continued)

OTHER PUBLICATIONS

"Road vehicles—Cybersecurity engineering", ISO/SAE International 21434, Aug. 2021.

(Continued)

*Primary Examiner* — Viral S Lakhia
(74) *Attorney, Agent, or Firm* — Greenblum & Bernstein, P.L.C.

(57) ABSTRACT

A priority determination system includes: an influenced entity extractor that obtains information indicating a vulnerability related to an ECU and extracts an ECU on which the vulnerability has influence; a calculator that calculates at least two risk values among an ECU risk value indicating a level of risk of a threat to the ECU caused by the vulnerability, a vehicle type risk value indicating a level of risk to a vehicle type equipped with the ECU to which the threat is caused by the vulnerability, and a spread risk value indicating a level of risk when the threat caused by the vulnerability is spread to the vehicle type; a priority determiner that (Continued)

determines, based on the at least two risk values, a priority of a countermeasure for the vulnerability; and an outputter that outputs the priority determined for each of a plurality of vulnerabilities.

16 Claims, 6 Drawing Sheets

(56) References Cited

U.S. PATENT DOCUMENTS 12,339,971 B2 * 6/2025 Komine ................ G06F 21/554
12,415,528 B2 * 9/2025 Cai ........................ G06V 20/56
2013/0185763 A1 7/2013 Yasuda
2021/0232687 A1 7/2021 Sasaki et al.
2022/0245258 A1 * 8/2022 Shivanna .............. G06F 21/577
2022/0414230 A1 * 12/2022 Gitelman .............. G06F 21/572
2023/0283625 A1 * 9/2023 Block ................. H04L 63/1416 726/25
2024/0078309 A1 * 3/2024 Khan .................... G06F 21/577
2024/0179172 A1 * 5/2024 Rowell ............... H04L 63/1433

FOREIGN PATENT DOCUMENTS

WO 2008/004498 1/2008
WO 2020/079928 4/2020

OTHER PUBLICATIONS

Notice of Reasons for Refusal Office Action issued in Japanese Counterpart Pat. Appl. No. 2024-131858, dated Nov. 12, 2024, along with an English translation.

* cited by examiner

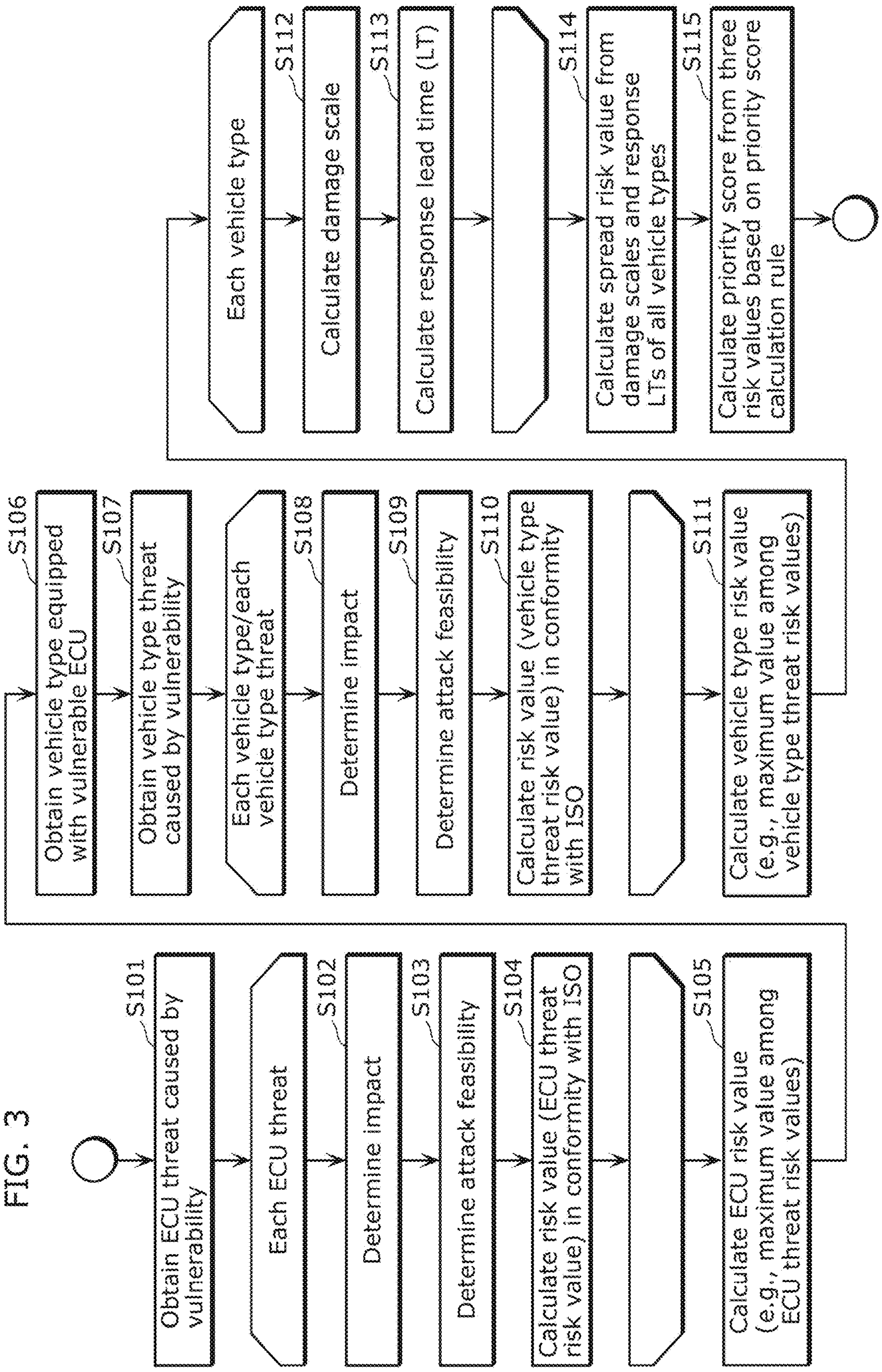

FIG. 3

S101 — Obtain ECU threat caused by vulnerability

S102 — Each ECU threat

S103 — Determine impact

S104 — Determine attack feasibility

Calculate risk value (ECU threat risk value) in conformity with ISO

S105 — Calculate ECU risk value (e.g., maximum value among ECU threat risk values)

S106 — Obtain vehicle type equipped with vulnerable ECU

S107 — Obtain vehicle type threat caused by vulnerability

S108 — Each vehicle type/each vehicle type threat

Determine impact

S109 — Determine attack feasibility

S110 — Calculate risk value (vehicle type threat risk value) in conformity with ISO S111 — Calculate vehicle type risk value (e.g., maximum value among vehicle type threat risk values)

Each vehicle type

S112 — Calculate damage scale

S113 — Calculate response lead time (LT)

S114 — Calculate spread risk value from damage scales and response LTs of all vehicle types S115 — Calculate priority score from three risk values based on priority score calculation rule

FIG. 4

| No | Vulnerability | Vulnerable ECU | ECU risk value | Vehicle type risk value | Spread risk value | Priority score |
|---|---|---|---|---|---|---|
| 1 | CVE-2023-XXXX | IVI | 5 | 5 | 5 | 15 |
| 2 | CVE-2023-XXXX | ADAS | 5 | 4 | 4 | 13 |
| 3 | CVE-2023-ZZZZ | OBC | 5 | 3 | 4 | 12 |
| ⋮ | ⋮ | ⋮ | ⋮ | ⋮ | ⋮ | ⋮ |

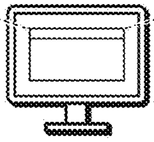

FIG. 5

| | | | |
|---|---|---|---|
| Coefficient α | Risk average value<br>Less than 3 | Risk average value<br>Greater than or equal to 3 to less than 4 | Risk average value<br>Greater than or equal to 4 |
| | 1 | 2 | 3 |
| Coefficient β | Number of vulnerable ECUs<br>1 | Number of vulnerable ECUs<br>2 or 3 | Number of vulnerable ECUs<br>Greater than or equal to 4 |
| | 1 | 2 | 3 |
| Coefficient γ | Number of vehicles shipped<br>Less than 1,000 | Number of vehicles shipped<br>Greater than or equal to 1,000 to less than 10,000 | Number of vehicles shipped<br>Greater than or equal to 10,000 |
| | 1 | 2 | 3 |

Start

S11

Obtain information indicating vulnerability

S12

Extract ECU on which vulnerability has influence

S13

Calculate at least two risk values among ECU risk value, vehicle type risk value, and spread risk value

S14

Determine priority of countermeasure for vulnerability

S15

Output priority

End

PRIORITY DETERMINATION SYSTEM AND PRIORITY DETERMINATION METHOD

CROSS REFERENCE TO RELATED APPLICATIONS

The present application is based on and claims priority of Japanese Patent Application No. 2023-208617 filed on Dec. 11, 2023 and Japanese Patent Application No. 2024-131858 filed on Aug. 8, 2024.

FIELD

The present disclosure relates to a priority determination system and a priority determination method for determining a priority of a countermeasure for a vulnerability.

BACKGROUND

Patent Literature (PTL) 1 discloses a technique of: analyzing the state of a system to calculate a risk value; determining, as a countermeasure for reducing the risk value, an emergency countermeasure that requires only a short period of time to function effectively and a normal countermeasure in which the degree of reduction in convenience of the system is small; and determining priorities of the countermeasures.

CITATION LIST

Patent Literature

[PTL 1]
Japanese Patent No. 5304243

SUMMARY

However, the system disclosed in PTL 1 can be improved upon.

In view of this, the present disclosure provides a priority determination system and a priority determination method that are capable of improving upon the above related art.

A priority determination system according to the present disclosure includes: an obtainer that obtains information indicating a vulnerability related to an electronic control unit (ECU); an extractor that extracts an ECU on which the vulnerability has influence; a calculator that calculates at least two risk values among an ECU risk value indicating a level of risk of a threat to the ECU caused by the vulnerability, a vehicle type risk value indicating a level of risk to a vehicle type equipped with the ECU to which the threat is caused by the vulnerability, and a spread risk value indicating a level of risk when the threat caused by the vulnerability is spread to the vehicle type; a determiner that determines, based on the at least two risk values, a priority of a countermeasure for the vulnerability; and an outputter that outputs the priority determined for each of a plurality of vulnerabilities, the plurality of vulnerabilities each being the vulnerability.

A priority determination system of the present disclosure includes: an obtainer that obtains information indicating a vulnerability related to an electronic control unit (ECU) and an ECU on which the vulnerability has influence; a calculator that calculates at least two risk values among an ECU risk value indicating a level of risk to the ECU on which the vulnerability has influence, a vehicle type risk value indicating a level of risk to a vehicle type equipped with the ECU on which the vulnerability has influence, and a spread risk value indicating a level of risk when a threat caused by the vulnerability is spread to the vehicle type; a determiner that determines, based on the at least two risk values, a priority of a countermeasure for the vulnerability; and an outputter that outputs the priority determined for each of one or more vulnerabilities, the one or more vulnerabilities each being the vulnerability.

A priority determination method according to the present disclosure is a priority determination method that is performed by a priority determination system. The priority determination method includes: obtaining information indicating a vulnerability related to an electronic control unit (ECU); extracting an ECU on which the vulnerability has influence; calculating at least two risk values among an ECU risk value indicating a level of risk of a threat to the ECU caused by the vulnerability, a vehicle type risk value indicating a level of risk to a vehicle type equipped with the ECU to which the threat is caused by the vulnerability, and a spread risk value indicating a level of risk when the threat caused by the vulnerability is spread to the vehicle type; determining, based on the at least two risk values, a priority of a countermeasure for the vulnerability; and outputting the priority determined for each of a plurality of vulnerabilities, the plurality of vulnerabilities each being the vulnerability.

A priority determination method according to the present disclosure is a priority determination method that is performed by a priority determination system. The priority determination method includes: obtaining information indicating a vulnerability related to an electronic control unit (ECU) and an ECU on which the vulnerability has influence; calculating at least two risk values among an ECU risk value indicating a level of risk to the ECU on which the vulnerability has influence, a vehicle type risk value indicating a level of risk to a vehicle type equipped with the ECU on which the vulnerability has influence, and a spread risk value indicating a level of risk when a threat caused by the vulnerability is spread to the vehicle type; determining, based on the at least two risk values, a priority of a countermeasure for the vulnerability; and outputting the priority determined for each of one or more vulnerabilities, the one or more vulnerabilities each being the vulnerability.

It should be noted that these general and specific aspects may be realized as a system, a method, an integrated circuit, a computer program, or a computer-readable recording medium such as a CD-ROM, or an arbitrary combination thereof.

A priority determination system or the like according to an aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 3 is a flowchart illustrating an example of operation of the priority determination system according to Embodiment 1.

FIG. 4 is a diagram illustrating an example of priorities outputted.

FIG. 5 is a diagram illustrating an example of a priority score calculation rule.

DESCRIPTION OF EMBODIMENTS (Circumstances Leading to an Aspect of the Present Disclosure)

In the technique disclosed in PTL 1, when there are a plurality of target systems, it is difficult to determine which of the plurality of target systems should be prioritized. For example, since various in-vehicle systems installed in various vehicle types are targeted when addressing a vehicle vulnerability, it is difficult to determine a priority of a countermeasure for a vehicle vulnerability. First, the difficulty of determining a priority of a countermeasure for a vehicle vulnerability is described with reference to FIG. 1.

Figure 1:
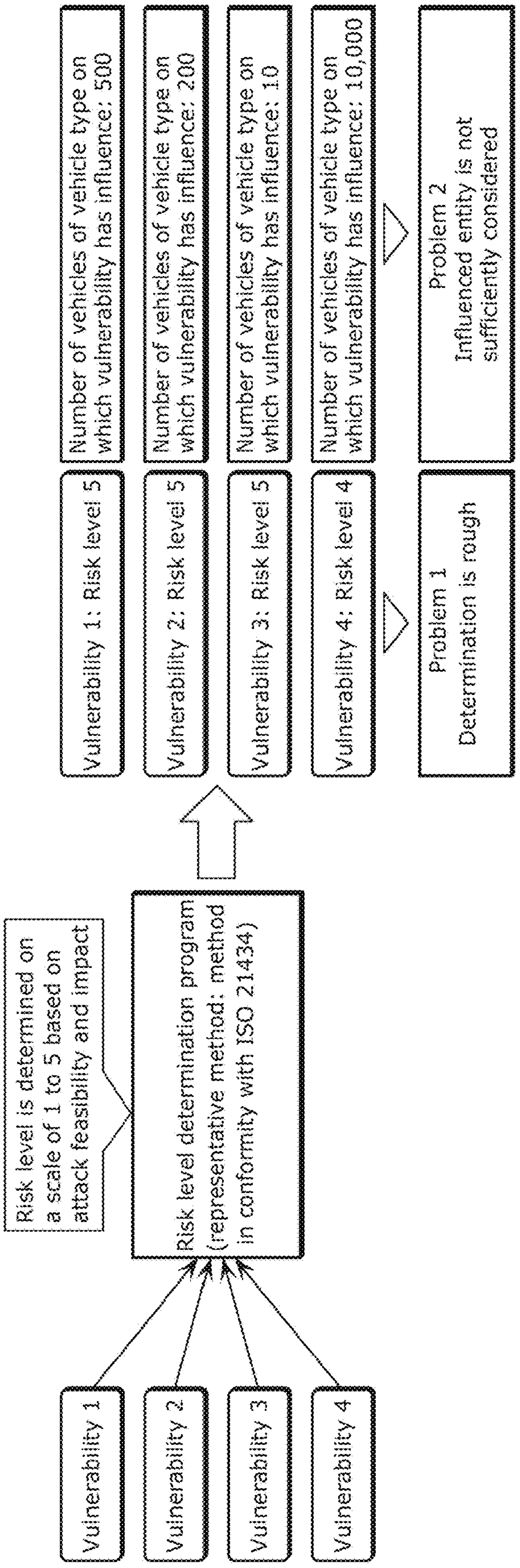
FIG. 1 is a diagram for explaining the difficulty of determining a priority of a countermeasure for a vehicle vulnerability.

FIG. 1 is a diagram for explaining the difficulty of determining a priority of a countermeasure for a vehicle vulnerability.

For example, it is assumed that vulnerabilities 1 to 4 have been found as vehicle vulnerabilities, specifically, as software vulnerabilities of an ECU installed in each of various vehicles. For example, the levels of risk of these vulnerabilities are determined based on a method that is in conformity with a standard such as ISO 21434. Specifically, the level of risk of each of vulnerabilities 1 to 4 is determined as any one of 1 to 5, based on attack feasibility and impact.

Thus, for example, it is assumed that the level of risk of each of vulnerabilities 1 to 3 has been determined as 5 and the level of risk of vulnerability 4 has been determined as 4, as illustrated in FIG. 1. In this case, since each of the levels of risk is determined on a scale of only 1 to 5, the determination is rough. Particularly, since a plurality of vulnerabilities having the same level of risk occur in a vehicle or the like in which a plurality of events that should be addressed occur, it is difficult to determine priorities of the plurality of vulnerabilities.

Moreover, for example, it is assumed that the number of vehicles of a vehicle type on which vulnerability 3 has influence is 10 and the number of vehicles of a vehicle type on which vulnerability 4 has influence is 10000, as illustrated in FIG. 1. In this case, since the level of risk of vulnerability 3 having influence on only 10 vehicles is higher than the level of risk of vulnerability 4 having influence on 10000, a higher priority is given to vulnerability 3 than vulnerability 4. Although a method that is in conformity with a standard such as ISO 21434 enables risk evaluation targeted at a single ECU or a single vehicle type, risk evaluation targeted at a plurality of vehicles of a plurality of vehicle types shipped, as a whole, is difficult and an influenced entity of a vulnerability is not sufficiently considered.

As described above, it is difficult to determine a priority of a countermeasure for a vehicle vulnerability.

Therefore, a priority determination system and a priority determination method that can determine a priority of a countermeasure for a vehicle vulnerability are described below.

Hereinafter, embodiments are specifically described with reference to the Drawings.

It should be noted that each of the embodiments described below shows a general or specific example. The numerical values, shapes, materials, constituent elements, the arrangement and connection of the constituent elements, steps, the processing order of the steps etc. shown in the embodiments below are mere examples, and therefore do not limit the scope of the present disclosure.

Embodiment 1

Hereinafter, a priority determination system according to Embodiment 1 is described.

Figure 2:
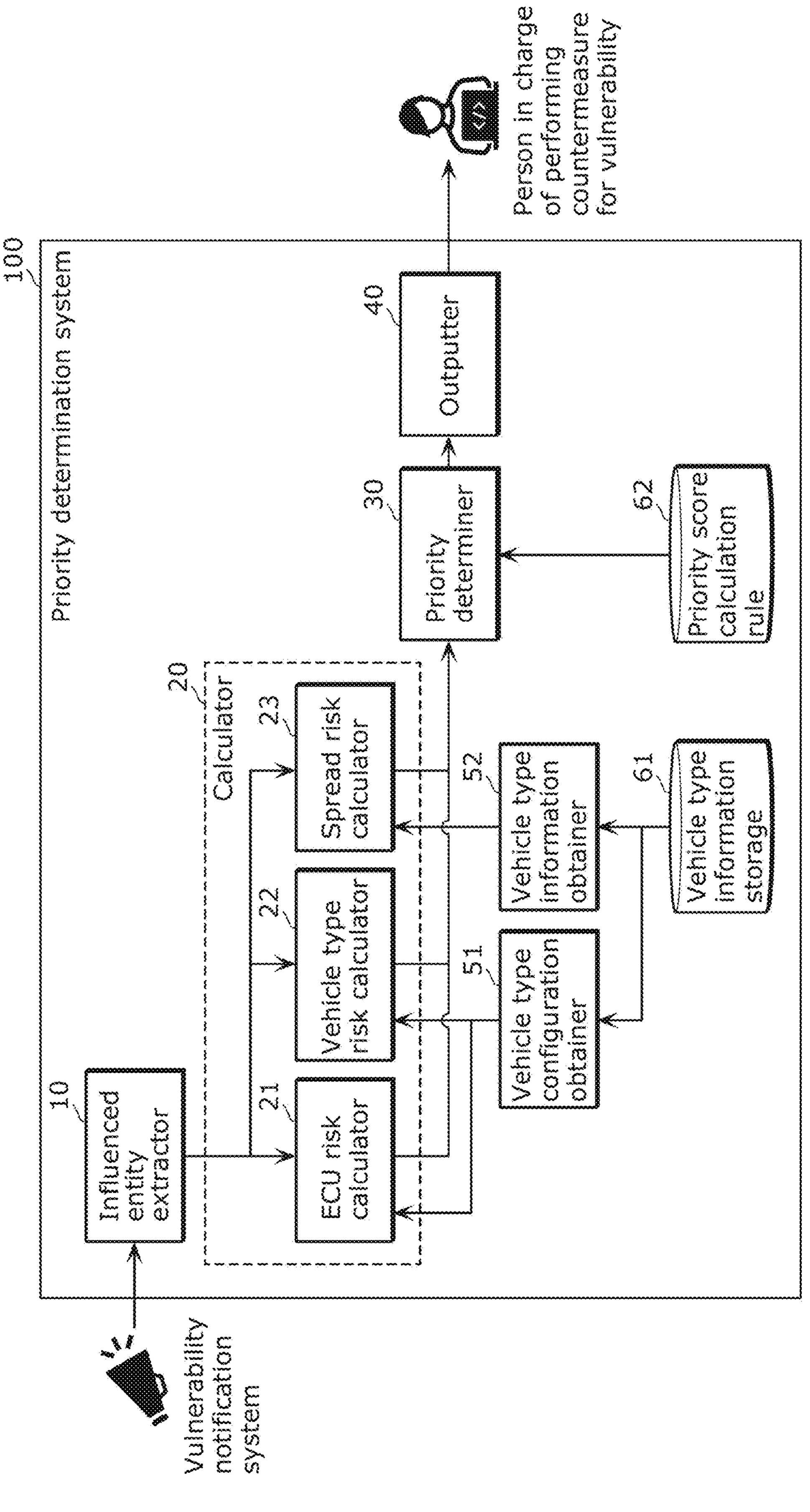
FIG. 2 is a block diagram illustrating an example of a priority determination system according to Embodiment 1.

FIG. 2 is a block diagram illustrating an example of priority determination system 100 according to Embodiment 1. It should be noted that, in addition to priority determination system 100, FIG. 2 shows: a vulnerability notification system that notifies a vulnerability found; and a person in charge of performing a countermeasure for a vulnerability.

Priority determination system 100 is a system for determining a priority of a countermeasure for a vehicle vulnerability. Priority determination system 100 includes influenced entity extractor 10, calculator 20, priority determiner 30, outputter 40, vehicle type configuration obtainer 51, vehicle type information obtainer 52, vehicle type information storage 61, and priority score calculation rule 62. Priority determination system 100 is a computer including a processor (microprocessor), memory, and the like. The memory is, for example, Read Only Memory (ROM), Random Access Memory (RAM), or the like, and can store a program that is executed by the processor. Influenced entity extractor 10, calculator 20, priority determiner 30, outputter 40, vehicle type configuration obtainer 51, and vehicle type information obtainer 52 are realized by the processor or the like that executes the program stored in the memory. Memory that stores vehicle type information storage 61 and priority score calculation rule 62 may be the same as or different from the memory that stores the program.

For example, priority determination system 100 may be a single computer (device) or a system including a plurality of computers. Moreover, for example, priority determination system 100 may be a server. It should be noted that the constituent elements included in priority determination system 100 may be included in a single server or distributed in a plurality of servers.

Influenced entity extractor 10 obtains, from the vulnerability notification system, information indicating a vulnerability related to an ECU installed in a vehicle, and extracts an ECU on which the vulnerability has influence. Influenced entity extractor 10 is an example of an obtainer and an extractor. For example, influenced entity extractor 10 is notified of various vulnerabilities of software of various ECUs by the vulnerability notification system, and extracts, for each of the various vulnerabilities, an ECU on which the vulnerability has influence (e.g., an ECU in which the software having the vulnerability has been installed). Moreover, for example, influenced entity extractor 10 may extract a vehicle type equipped with an ECU on which a vulnerability has influence. Thus, influenced entity extractor 10 extracts an influenced entity of a vulnerability.

Calculator 20 obtains a threat caused by a vulnerability, and calculates at least two risk values among an ECU risk value indicating a level of risk of the threat to an ECU, a vehicle type risk value indicating a level of risk to a vehicle type equipped with the ECU to which the threat is caused by the vulnerability, and a spread risk value indicating a level of risk when the threat caused by the vulnerability is spread to the vehicle type. For example, calculator 20 calculates at least two risk values for one ECU on which a vulnerability has influence. Alternatively, for example, calculator 20 calculates at least two risk values for a combination of one ECU on which a vulnerability has influence and one vehicle type equipped with the ECU.

For example, calculator 20 may include ECU risk calculator 21 that calculates an ECU risk value, vehicle type risk calculator 22 that calculates a vehicle type risk value, and spread risk calculator 23 that calculates a spread risk value, and calculator 20 may calculate all of an ECU risk value, a vehicle type risk value, and a spread risk value.

Vehicle type information storage 61 stores vehicle configuration-related information, and vehicle type configuration obtainer 51 obtains the vehicle configuration-related information from vehicle type information storage 61. The vehicle configuration-related information includes, for example, configurations of ECUs installed in various vehicle types, an internal configuration of each of the ECUs, or the like. Moreover, vehicle type information storage 61 stores vehicle type management-related information, and vehicle type information obtainer 52 obtains the vehicle type management-related information from vehicle type information storage 61. For example, the vehicle type management-related information includes, for each of various vehicle types, the number of vehicles shipped, an operating rate of the vehicles, a response difficulty, or the like. For example, ECU risk calculator 21 calculates an ECU risk value by using information on an internal configuration of each of ECUs, and vehicle type risk calculator 22 calculates a vehicle type risk value by using information on a configuration of each of the ECUs of various vehicle types. For example, spread risk calculator 23 calculates a spread risk value by using information including, for each of the various vehicle types, the number of vehicles shipped, an operating rate of the vehicles, a response difficulty, or the like.

Priority determiner 30 determines, based on at least two risk values calculated, a priority of a countermeasure for a vulnerability. Priority determiner 30 is an example of a determiner. For example, priority determiner 30 determines a priority of a countermeasure for a vulnerability based on three risk values that are an ECU risk value, a vehicle type risk value, and a spread risk value. Moreover, for example, priority determiner 30 uses priority score calculation rule 62 to determine a priority of a countermeasure for a vulnerability. The detail of priority score calculation rule 62 is described later. For example, priority determiner 30 determines a priority of a countermeasure for one ECU on which a vulnerability has influence. Alternatively, for example, priority determiner 30 determines a priority of a countermeasure for a combination of one ECU on which a vulnerability has influence and one vehicle type equipped with the ECU.

For example, a priority is determined for each of a plurality of vulnerabilities notified from the vulnerability notification system, and outputter 40 outputs the priorities determined for the plurality of vulnerabilities. For example, outputter 40 outputs, to a terminal such as a Personal Computer (PC) operated by the person in charge of performing a countermeasure for a vulnerability, priorities determined for a plurality of vulnerabilities. Thus, the person in charge of performing a countermeasure for a vulnerability can decide which of the plurality of vulnerabilities should be addressed first.

Next, an example of operation of priority determination system 100 is described with reference to FIG. 3. Here, an example in which calculator 20 calculates three risk values that are an ECU risk value, a vehicle type risk value, and a spread risk value and priority determiner 30 determines a priority of a countermeasure for a vulnerability based on the three risk values that are the ECU risk value, the vehicle type risk value, and the spread risk value is described.

FIG. 3 is a flowchart illustrating an example of operation of priority determination system 100 according to Embodiment 1.

In FIG. 3, an example in which a priority is determined for one ECU on which a vulnerability has influence is described. In other words, in FIG. 3, calculator 20 calculates an ECU risk value, a vehicle type risk value, and a spread risk value, for one ECU on which a vulnerability has influence, and priority determiner 30 determines a priority of a countermeasure for the ECU on which the vulnerability has influence. For example, the processes illustrated in FIG. 3 are performed for one ECU on which a vulnerability has influence, and also performed for another ECU on which the vulnerability has influence. Moreover, the processes are performed for each of a plurality of vulnerabilities. Thus, a priority is determined for each combination of a vulnerability and an ECU.

ECU risk calculator 21 obtains a threat to an ECU caused by a vulnerability (also referred to as an ECU threat) (step S101). For example, there are a plurality of ECU threats caused by a vulnerability, and ECU risk calculator 21 obtains the plurality of ECU threats. ECU risk calculator 21 performs, for each of the plurality of ECU threats, the processes in steps S102 to S104.

For a certain ECU threat, ECU risk calculator 21 determines impact (step S102), determines attack feasibility (step S103), and calculates a risk value (also referred to as an ECU threat risk value) that is in conformity with ISO (step S104). For example, ECU risk calculator 21 calculates an ECU threat risk value based on a method that is in conformity with a standard such as ISO 21434. ECU risk calculator 21 calculates a plurality of ECU threat risk values by performing the processes in steps S102 to S104 for each of a plurality of ECU threats. An ECU threat risk value calculated based on a method that is in conformity with ISO 21434 is on a scale of 1 to 5.

ECU risk calculator 21 calculates an ECU risk value for one ECU on which a vulnerability has influence (step S105). For example, ECU risk calculator 21 calculates, as an ECU risk value for one ECU on which a vulnerability has influence, a maximum value among ECU threat risk values that have been calculated for the ECU by performing the processes in steps S102 to S104. Similar to an ECU threat risk value, an ECU risk value is on a scale of 1 to 5.

Next, vehicle type risk calculator 22 obtains a vehicle type equipped with one ECU on which a vulnerability has influence (also referred to as a vulnerable ECU) (step S106). For example, there are a plurality of vehicle types each equipped with a vulnerable ECU, and vehicle type risk calculator 22 obtains the plurality of vehicle types. Moreover, ECU risk calculator 22 obtains a threat to a vehicle type caused by a vulnerability (also referred to as a vehicle type threat) (step S107). For example, there are a plurality of vehicle type threats caused by a vulnerability, and vehicle type risk calculator 22 obtains the plurality of vehicle type threats. Vehicle type risk calculator 22 performs, for each of the plurality of vehicle type threats of the plurality of vehicle types, the processes in steps S108 to S110.

For a certain vehicle type threat of a certain vehicle type, vehicle type risk calculator 22 determines impact (step S108), determines attack feasibility (step S109), and calculates a risk value (also referred to as a vehicle type threat risk value) that is in conformity with ISO (step S110). For example, vehicle type risk calculator 22 calculates a vehicle type threat risk value based on a method that is in conformity with a standard such as ISO 21434. Vehicle type risk calculator 22 calculates a plurality of vehicle type threat risk values of a plurality of vehicle types by performing the processes in steps S108 to S110 for each of a plurality of vehicle type threats of the plurality of vehicle types. A vehicle type threat risk value calculated based on a method that is in conformity with ISO 21434 is on a scale of 1 to 5.

Vehicle type risk calculator 22 calculates a vehicle type risk value for one ECU on which a vulnerability has influence (step S111). For example, vehicle type risk calculator 22 calculates, as a vehicle type risk value for one ECU on which a vulnerability has influence, a maximum value among vehicle type threat risk values that have been calculated for the ECU by performing the processes in steps S108 to S110. Similar to a vehicle type threat risk value, a vehicle type risk value is on a scale of 1 to 5.

Next, spread risk calculator 23 performs, for each of a plurality of vehicle types each equipped with a vulnerable ECU, the processes in step S112 and step S113.

Based on the number of vehicles of a vehicle type shipped or a response difficulty of the vehicle type, spread risk calculator 23 calculates a damage scale (anticipated damage) when a threat occurs (step S112) and calculates a response time (response lead time (LT)) required for responding to the threat (step S113). Spread risk calculator 23 calculates damage scales and response LTs for a plurality of vehicle types by performing, for each of the plurality of vehicle types, the processes in steps S112 and S113.

Spread risk calculator 23 calculates a spread risk value from damage scales and response LTs of all vehicle types each equipped with a vulnerable ECU, for example (step S114). For example, spread risk calculator 23 calculates a spread risk value for one ECU on which a vulnerability has influence, by comparing a representative value (e.g., an average value, a median value, or the like) of the damage scales and a representative value of response LTs of the all vehicle types with a reference value for damage scale and a reference value for response LT, respectively. A spread risk value is, for example, normalized to a value on a scale of 1 to 5, to match an ECU risk value and a vehicle type risk value on a scale of 1 to 5.

Moreover, based on priority score calculation rule 62, priority determiner 30 calculates a priority score from three risk values that are an ECU risk value, a vehicle type risk value, and a spread risk value (step S115). For example, priority determiner 30 sorts ECUs on which a vulnerability has influence in descending order of priority score, and determines a higher priority for an ECU with a higher priority score. Outputter 40 outputs priorities determined. Here, an example of priorities outputted is described with reference to FIG. 4.

FIG. 4 is a diagram illustrating an example of priorities outputted. For example, by outputting priorities, a table as illustrated in FIG. 4 is displayed on a display or the like of the person in charge of performing a countermeasure for a vulnerability.

For example, it is assumed that for an in-vehicle infotainment (IVI) on which a vulnerability "CVE-2023-XXXX" has influence, an ECU risk value of 5, a vehicle type risk value of 5, a spread risk value of 5 are calculated and a priority score of 15 is calculated. Moreover, for example, it is assumed that for an advanced driver-assistance system (ADAS) on which a vulnerability "CVE-2023-XXXX" has influence, an ECU risk value of 5, a vehicle type risk value of 4, a spread risk value of 4 are calculated and a priority score of 13 is calculated. Furthermore, for example, it is assumed that for an on-board charger (OBC) on which a vulnerability "CVE-2023-ZZZZ" has influence, an ECU risk value of 5, a vehicle type risk value of 3, a spread risk value of 4 are calculated and a priority score of 12 is calculated. In this case, priority determiner 30 sorts the ECUs in descending order of priority score as illustrated in FIG. 4, and gives a highest priority to a countermeasure for the IVI on which "CVE-2023-XXXX" has influence, a second highest priority to a countermeasure for the ADAS on which "CVE-2023-XXXX" has influence, and a third highest priority to a countermeasure for the OBC on which "CVE-2023-ZZZZ" has influence.

For example, priority determiner 30 determines coefficients each of which is used for weighting a different one of at least two risk values (here, an ECU risk value, a vehicle type risk value, and a spread risk value), based on priority score calculation rule 62. Then, priority determiner 30 determines a priority of a countermeasure for a vulnerability, based on the ECU risk value, the vehicle type risk value, and the spread risk value that have been weighted by the coefficients. For example, a priority score is calculated by an expression: $\alpha \times$ECU risk value$+\beta \times$vehicle type risk value$+\gamma \times$spread risk value, where $\alpha$ is a coefficient for weighting an ECU risk value, $\beta$ is a coefficient for weighting a vehicle type risk value, and $\gamma$ is a coefficient for weighting a spread risk value. It should be noted that a priority score in a case where each of coefficients $\alpha$, $\beta$, and $\gamma$ is 1 is shown in FIG. 4.

For example, coefficient $\alpha$ for weighting an ECU risk value is determined based on an average value of ECU threat risk values each of which has been calculated by the processes in steps S102 to S104 in FIG. 3. Specifically, coefficient $\alpha$ is determined so that coefficient $\alpha$ becomes higher as the average value becomes higher. For example, coefficient $\beta$ for weighting a vehicle type risk value is determined based on the number of vulnerable ECUs installed. Specifically, coefficient $\beta$ is determined so that coefficient $\beta$ becomes higher as the number of vulnerable ECUs increases. For example, coefficient $\gamma$ for weighting a spread risk value is determined based on the number of vehicles of a vehicle type shipped. Specifically, coefficient $\gamma$ is determined so that coefficient $\gamma$ becomes higher as the number of vehicles of a vehicle type shipped increases. Here, an example of priority score calculation rule 62 is described with reference to FIG. 5.

FIG. 5 is a diagram illustrating an example of priority score calculation rule 62.

As illustrated in FIG. 5, coefficient $\alpha$ is determined as 1 when an average value (also referred to as a risk average value) of ECU threat risk values is less than 3, coefficient $\alpha$ is determined as 2 when a risk average value is greater than or equal to 3 to less than 4, and coefficient $\alpha$ is determined as 3 when a risk average value is greater than or equal to 4. Moreover, coefficient $\beta$ is determined as 1 when the number of vulnerable ECUs installed is 1, coefficient $\beta$ is determined as 2 when the number of vulnerable ECUs installed is 2 or 3, and coefficient $\beta$ is determined as 3 when the number of vulnerable ECUs installed is greater than or equal to 4. Furthermore, coefficient $\gamma$ is determined as 1 when the number of vehicles shipped is less than 1000, coefficient $\gamma$ is determined as 2 when the number of vehicles shipped is greater than or equal to 1000 to less than 10000, coefficient $\gamma$ is determined as 3 when the number of vehicles shipped is greater than or equal to 10000. It should be noted that an index and a threshold value in a method for determining a coefficient is an example, and may be appropriately set.

As described above, a priority of a countermeasure for a vulnerability related to an ECU of a vehicle is determined in terms of at least two risk values among an ECU risk value, a vehicle type risk value, and a spread risk value. Since various in-vehicle systems installed in various vehicle types are targeted when addressing a vehicle vulnerability, it is difficult to determine a priority of a countermeasure for a vehicle vulnerability; however, since priority determination system 100 can determine a priority in terms of not a single risk value but at least two risk values, priority determination system 100 can determine a priority of a countermeasure for a vehicle vulnerability.

Embodiment 2

In Embodiment 2, only the points that are different from Embodiment 1 will be described.

Priority determination system 100 includes influenced entity extractor 10, calculator 20, priority determiner 30, outputter 40, vehicle type configuration obtainer 51, vehicle type information obtainer 52, vehicle type information storage 61, and priority score calculation rule 62.

Influenced entity extractor 10 obtains, from a vulnerability notification system, information indicating a vulnerability related to an ECU installed in a vehicle and an influenced entity of the vulnerability. Moreover, influenced entity extractor 10 does not necessarily obtain an influenced entity of a vulnerability from the vulnerability notification system, and may obtain an influenced entity of a vulnerability independently of information indicating the vulnerability. It should be noted that when information indicating a vulnerability obtained does not include an influenced entity of the vulnerability, influenced entity extractor 10 may extract an ECU on which the vulnerability has influence. For example, influenced entity extractor 10 is notified of various vulnerabilities of software of various ECUs by the vulnerability notification system, and extracts, for each of the vulnerabilities, an ECU on which the vulnerability has influence (e.g., an ECU in which software having the vulnerability is installed). Moreover, for example, influenced entity extractor 10 may extract a vehicle type equipped with an ECU on which the vulnerability has influence. Thus, influenced entity extractor 10 extracts an influenced entity of a vulnerability.

Outputter 40 outputs a priority determined for each of one or more vulnerabilities. For example, outputter 40 outputs, to a terminal such as a PC operated by a person in charge of performing a countermeasure for a vulnerability, a priority determined for each of one or more vulnerabilities. Thus, the person in charge of performing a countermeasure for a vulnerability can decide whether a certain vulnerability should be preferentially addressed or which of the one or more vulnerabilities should be addressed first.

In Embodiment 1, a table as illustrated in FIG. 4 is displayed when priority determination system 100 obtains vulnerability information indicated by "CVE-2023-XXXX" and "IVI and ADAS" as an influenced entity of "CVE-2023-XXXX"; however, in the present embodiment, outputter 40 outputs only priorities for vulnerable ECUs that are the IVI and the ADAS on which "CVE-2023-XXXX" has influence in FIG. 4. Moreover, for example, when priority determination system 100 obtains "CVE-2023-XXXX", "CVE-2023-ZZZZ", and an influenced entity of each of "CVE-2023-XXXX" and "CVE-2023-ZZZZ", only a priority for the IVI on which "CVE-2023-XXXX" having the highest priority score has influence may be displayed. Furthermore, a priority outputted is not limited to a priority related to a vulnerability having the highest priority score, and a priority outputted may be selected based on a reference other than a priority score, such as a priority related to a vulnerability related to a specific ECU.

In FIG. 3, an example in which a priority is determined for one ECU on which a vulnerability has influence is described. Namely, in FIG. 3, calculator 20 calculates an ECU risk value, a vehicle type risk value, and a spread risk value, for one ECU on which a vulnerability has influence, and priority determiner 30 determines a priority of a countermeasure for the ECU on which the vulnerability has influence. For example, the processes illustrated in FIG. 3 are performed for one ECU on which a vulnerability has influence, and also performed for another ECU on which the vulnerability has influence. Moreover, the processes are performed for each of one or more vulnerabilities. Thus, a priority is determined for each combination of a vulnerability and an ECU.

As described above, a priority can be determined by using an influenced entity of a vulnerability determined by another system. Moreover, a priority can be determined for one vehicle vulnerability in terms of at least two risk values among an ECU risk value, a vehicle type risk value, and a spread risk value.

While various embodiments have been described herein above, it is to be appreciated that various changes in form and detail may be made without departing from the spirit and scope of the present disclosure as presently or hereafter claimed.

Other Embodiments

The embodiments shown above have been described as examples of a technique according to the present disclosure. However, the technique according to the present disclosure is not limited to these embodiments and is applicable to an embodiment to which a modification, a permutation, an addition, an omission, etc. have appropriately made. For example, a variation described below is also included in an embodiment of the present disclosure.

For example, the number of vehicles shipped that is used for calculating a spread risk value may be the number of vehicles shipped on a country basis or an area basis. The number of vehicles shipped is different depending on the country or area, and because of this, anticipated damage when a threat occurs or a response time required for responding to the threat is also different depending on the country or area. Accordingly, a priority can be determined for each country or area by calculating anticipated damage when a threat occurs or a response time required for responding to the threat, based on the number of vehicles shipped on a country basis or an area basis.

For example, the number of vehicles shipped that is used for calculating a spread risk value may be the number of vehicles in operation among vehicles shipped. The vehicles shipped may include a vehicle not in operation. Accordingly, by calculating anticipated damage when a threat occurs or a response time required for responding to the threat, based on the number of vehicles shipped and in operation, a priority of a countermeasure for a vulnerability of the vehicles in operation can be determined.

For example, when a plurality of vulnerabilities include two or more vulnerabilities having the same priority determined based on at least two risk values weighted by at least two coefficients, priority determiner 30 may give a highest priority to, among the two or more vulnerabilities, a vulnerability having the highest risk value among risk values each of which is one of the at least two risk values and has been weighted by the highest coefficient among the at least two coefficients. For example, it is assumed that coefficient α for weighting an ECU risk value is 3, coefficient β for weighting a vehicle type risk value is 2, and coefficient γ for weighting a spread risk value is 1. At this time, it is assumed that there are two vulnerabilities having the same priority score, the ECU risk value of one of the two vulnerabilities is 5, and the ECU risk value of the other of the two vulnerabilities is 4. In this case, a higher priority is given to the one of the two vulnerabilities having higher ECU risk value than the other of the two vulnerabilities. Accordingly, when there are a plurality of vulnerabilities having the same priority, a highest priority is given to, among the plurality of vulnerabilities, a vulnerability having the highest risk value among risk values each of which has been weighted by the highest coefficient, that is, has the biggest influence.

For example, a level of severity may be determined for each of at least two risk values, and when a plurality of vulnerabilities include two or more vulnerabilities having the same priority determined based on the at least two risk values, priority determiner 30 may give a highest priority to, among the two or more vulnerabilities, a vulnerability having the highest risk value among risk values each of which has the highest level of severity. For example, in a case where an ECU risk value has the highest level of severity among an ECU risk value, a vehicle type risk value, and a spread risk value, it is assumed that there are two vulnerabilities having the same priority score, the ECU risk value of one of the two vulnerabilities is 5, and the ECU risk value of the other of the two vulnerabilities is 4. In this case, a higher priority is given to the one of the two vulnerabilities having higher ECU risk value than the other of the two vulnerabilities. Accordingly, when there are a plurality of vulnerabilities having the same priority, a highest priority is given to, among the plurality of vulnerabilities, a vulnerability having the highest risk value among risk values each of which has the highest level of severity.

For example, although an example in which calculator 20 calculates at least two risk values for one ECU on which a vulnerability has influence and priority determiner 30 determines a priority of a countermeasure for the ECU on which the vulnerability has influence has been described in FIG. 3, the present disclosure is not limited to this example. For example, calculator 20 may calculate at least two risk values for a combination of one ECU on which a vulnerability has influence and one vehicle type equipped with the ECU and priority determiner 30 may determine a priority of a countermeasure for the combination on which the vulnerability has influence. In this case, for example, the processes illustrated in FIG. 3 are performed for a combination of one ECU on which a vulnerability has influence and one vehicle type equipped with the ECU, and also performed for another combination on which the vulnerability has influence. Moreover, the processes are performed for each of a plurality of vulnerabilities. Thus, a priority is determined for each combination of a vulnerability, an ECU, and a vehicle type.

For example, although an example in which an ECU risk value is a value that is in conformity with a standard has been described, an ECU risk value may be a value based on an arbitrary algorithm for calculating a risk value.

For example, although an example in which a vehicle type risk value is a value that is in conformity with a standard has been described, a vehicle type risk value may be a value based on an arbitrary algorithm for calculating a risk value.

For example, although an example in which a spread risk value is normalized to a value on a scale of 1 to 5 has been described, a spread risk value may be an absolute value based on a damage scale or a response time.

For example, although an example in which priority determination system 100 includes vehicle type configuration obtainer 51, vehicle type information obtainer 52, vehicle type information storage 61, and priority score calculation rule 62 has been described, priority determination system 100 does not necessarily include these constituent elements.

For example, the present disclosure can be realized as priority determination system 100 and can also be realized as a priority determination method including steps (processes) performed by the constituent elements included in priority determination system 100.

Figure 6:
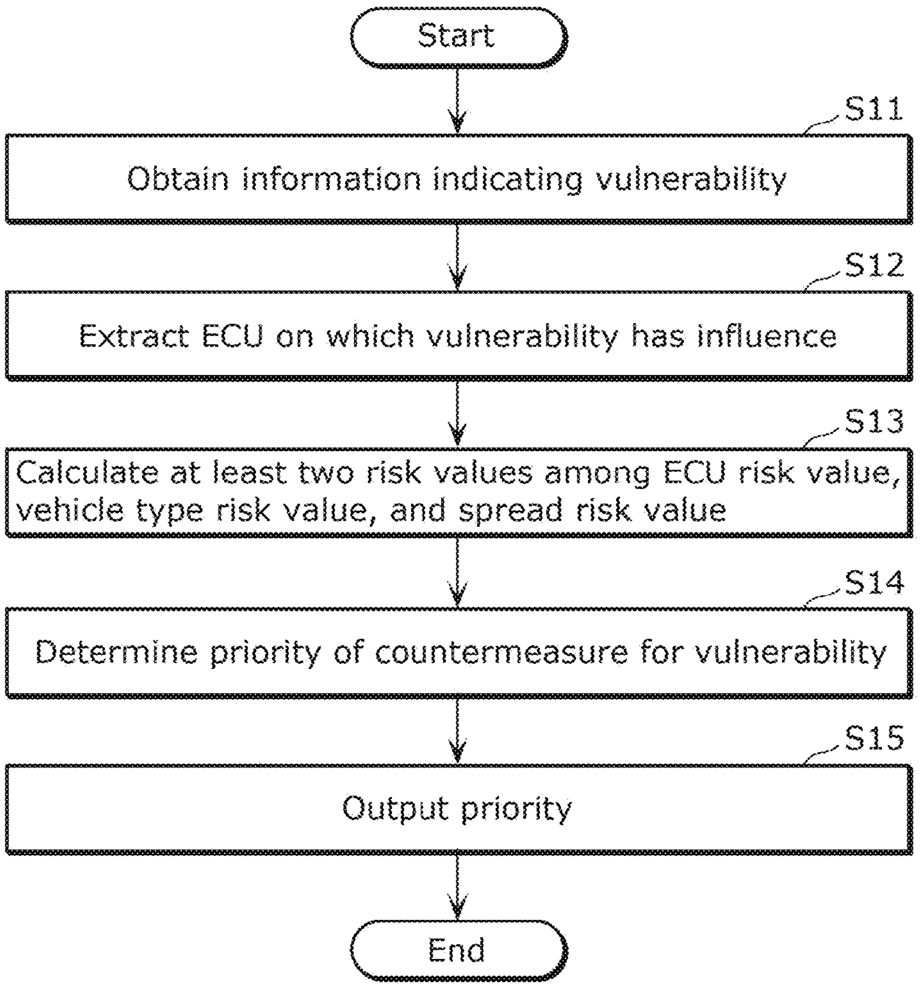
FIG. 6 is a flowchart illustrating an example of a priority determination method according to another embodiment.
Figure 7:
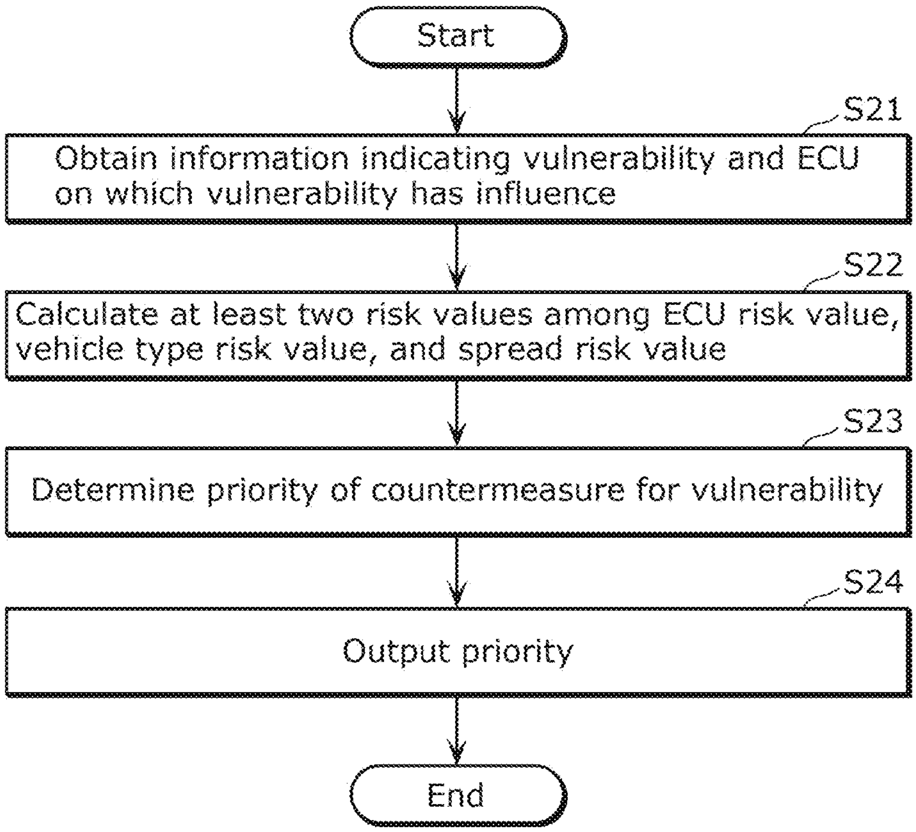
FIG. 7 is a flowchart illustrating an example of a priority determination method according to another embodiment.

Each of FIG. 6 and FIG. 7 is a flowchart illustrating an example of a priority determination method according to another embodiment.

A priority determination method is a priority determination method performed by priority determination system 100. As illustrated in FIG. 6, the priority determination method includes: obtaining information indicating a vulnerability related to an ECU (step S11); extracting an ECU on which the vulnerability has influence (step S12); calculating at least two risk values among an ECU risk value indicating a level of risk of a threat to the ECU caused by the vulnerability, a vehicle type risk value indicating a level of risk to a vehicle type equipped with the ECU to which the threat is caused by the vulnerability, and a spread risk value indicating a level of risk when the threat caused by the vulnerability is spread to the vehicle type (step S13); determining, based on the at least two risk values, a priority of a countermeasure for the vulnerability (step S14); and outputting the priority determined for each of a plurality of vulnerabilities, the plurality of vulnerabilities each being the vulnerability (step S15).

A priority determination method is a priority determination method performed by priority determination system 100. As illustrated in FIG. 7, the priority determination method includes: obtaining information indicating a vulnerability related to an electronic control unit (ECU) and an ECU on which the vulnerability has influence (step S21); calculating at least two risk values among an ECU risk value indicating a level of risk to the ECU on which the vulnerability has influence, a vehicle type risk value indicating a level of risk to a vehicle type equipped with the ECU on which the vulnerability has influence, and a spread risk value indicating a level of risk when a threat caused by the vulnerability is spread to the vehicle type (step S22); determining, based on the at least two risk values, a priority of a countermeasure for the vulnerability (step S23); and outputting the priority determined for each of one or more vulnerabilities, the one or more vulnerabilities each being the vulnerability (step S24).

For example, the present disclosure can be realized as a program for causing a computer (processor) to perform steps included in a priority determination method. Moreover, the present disclosure may be realized as a non-transitory computer-readable recording medium, such as a CD-ROM, having recorded thereon the program.

For example, when the present disclosure is realized as a program (software), the program is executed by using a hardware resource of a computer, such as a CPU, memory, and an input and output circuit, whereby each step is performed. In other words, each step is performed by the CPU obtaining data from, for example, the memory or the input and output circuit, performing calculation, and outputting the calculation result to, for example, the memory or the input and output circuit.

It should be noted that in the above-described embodiment, each of the constituent elements included in priority determination system 100 may be configured as dedicated hardware or may be realized by executing a software program suitable for the constituent element. Each of the constituent elements may be realized by a program executing unit, such as a CPU or processor, loading and executing a software program recorded in a recording medium such as a hard disk or a semiconductor memory.

Part or all of the functions of priority determination system 100 according to the above-described embodiment is typically realized as a large scale integration circuit (LSI) that is an integrated circuit. The functions of priority determination system 100 may be independently integrated on a single chip, or the part or all of the functions of priority determination system 100 may be integrated on a single chip. Moreover, circuit integration is not limited to LSI and may be realized as a dedicated circuit or a general purpose processor. A field programmable gate array (FPGA) which allows programming after LSI manufacturing or a reconfigurable processor which allows reconfiguration of the connections and settings of circuit cells inside the LSI may also be used.

Furthermore, when advancement in semiconductor technology or derivatives of other technologies brings forth a circuit integration technology which replaces LSI, it will be appreciated that such a circuit integration technology may be used to integrate each of the constituent elements included in priority determination system 100.

Note that embodiments resulting from various modifications of the embodiments as well as embodiments resulting from arbitrary combinations of constituent elements and functions of the embodiments that may be conceived by those skilled in the art are intended to be included within the scope of the present disclosure as long as they do not depart from the essence of the present disclosure.

(Note)

According to the above-described embodiment, the following techniques are disclosed.

(Technique 1)

A priority determination system includes: an obtainer that obtains information indicating a vulnerability related to an electronic control unit (ECU); an extractor that extracts an ECU on which the vulnerability has influence; a calculator that calculates at least two risk values among an ECU risk value indicating a level of risk of a threat to the ECU caused by the vulnerability, a vehicle type risk value indicating a level of risk to a vehicle type equipped with the ECU to which the threat is caused by the vulnerability, and a spread risk value indicating a level of risk when the threat caused by the vulnerability is spread to the vehicle type; a determiner that determines, based on the at least two risk values, a priority of a countermeasure for the vulnerability; and an outputter that outputs the priority determined for each of a plurality of vulnerabilities, the plurality of vulnerabilities each being the vulnerability.

According to this technique, a priority of a countermeasure for a vulnerability related to an ECU of a vehicle is determined in terms of at least two risk values among an ECU risk value, a vehicle type risk value, and a spread risk value. Since various in-vehicle systems installed in various vehicle types are targeted when addressing a vehicle vulnerability, it is difficult to determine a priority of a countermeasure for a vehicle vulnerability; however, since the priority determination system can determine a priority in terms of not a single risk value but at least two risk values, the priority determination system can determine a priority of a countermeasure for a vehicle vulnerability.

(Technique 2)

A priority determination system includes: an obtainer that obtains information indicating a vulnerability related to an electronic control unit (ECU) and an ECU on which the vulnerability has influence; a calculator that calculates at least two risk values among an ECU risk value indicating a level of risk to the ECU on which the vulnerability has influence, a vehicle type risk value indicating a level of risk to a vehicle type equipped with the ECU on which the vulnerability has influence, and a spread risk value indicating a level of risk when a threat caused by the vulnerability is spread to the vehicle type; a determiner that determines, based on the at least two risk values, a priority of a countermeasure for the vulnerability; and an outputter that outputs the priority determined for each of one or more vulnerabilities, the one or more vulnerabilities each being the vulnerability.

According to this technique, a priority for a countermeasure for a vehicle vulnerability can be determined by using an influenced entity of the vehicle vulnerability determined by another system. Moreover, since a priority can be determined for one vehicle vulnerability in terms of at least two risk values among an ECU risk value, a vehicle type risk value, and a spread risk value, a priority for a countermeasure for a vehicle vulnerability can be determined.

(Technique 3)

In the priority determination system according to Technique 1 or 2, the calculator calculates anticipated damage when the threat occurs or a response time required for responding to the threat, based on vehicle type management-related information, and calculates the spread risk value based on the anticipated damage or the response time.

According to this technique, a priority can be determined taking into consideration anticipated damage when a threat occurs or a response time required for responding to the threat.

(Technique 4)

In the priority determination system according to Technique 3, the vehicle type management-related information includes a total number of vehicles of the vehicle type shipped or a response difficulty of the vehicle type.

For example, anticipated damage when a threat occurs or a response time required for responding to the threat can be calculated by using the number of vehicles of a vehicle type shipped or a response difficulty of the vehicle type.

(Technique 5)

In the priority determination system according to Technique 4, the total number of vehicles shipped is a total number of vehicles of the vehicle type shipped on a country basis or an area basis.

The number of vehicles shipped is different depending on the country or area, and because of this, anticipated damage when a threat occurs or a response time required for responding to the threat is also different depending on the country or area. Accordingly, a priority can be determined for each country or area by calculating anticipated damage when a threat occurs or a response time required for responding to the threat, based on the number of vehicles shipped on a country basis or an area basis.

(Technique 6)

In the priority determination system according to Technique 4 or 5, the total number of vehicles shipped is a total number of vehicles in operation among vehicles of the vehicle type shipped.

Vehicles shipped may include a vehicle not in operation. Accordingly, by calculating anticipated damage when a threat occurs or a response time required for responding to the threat based on the number of vehicles shipped and in operation, a priority of a countermeasure for a vulnerability of the vehicles in operation can be determined.

(Technique 7)

In the priority determination system according to any one of Techniques 1 to 6, the calculator calculates the ECU risk value or the vehicle type risk value, based on a method in conformity with a standard.

According to this technique, an ECU risk value or a vehicle type risk value can be easily calculated based on a method that is in conformity with a standard such as ISO 21434.

(Technique 8)

In the priority determination system according to any one of Techniques 1 to 7, the determiner determines at least two coefficients each of which is for weighting a different one of the at least two risk values, and determines, based on the at least two risk values weighted by the at least two coefficients, the priority of the countermeasure for the vulnerability.

According to this technique, a priority can be accurately determined since at least two risk values are weighted by at least two coefficients.

(Technique 9)

In the priority determination system according to Technique 2, the determiner determines at least two coefficients each of which is for weighting a different one of the at least two risk values, and determines, based on the at least two risk values weighted by the at least two coefficients, the priority of the countermeasure for the vulnerability.

(Technique 10)

In the priority determination system according to Technique 9, the one or more vulnerabilities are a plurality of vulnerabilities when a total number of the one or more vulnerabilities is plural, the plurality of vulnerabilities each being the vulnerability.

According to this technique, a priority can be accurately determined since at least two risk values are weighted by at least two coefficients.

(Technique 11)

In the priority determination system according to Technique 8 or 10, when the plurality of vulnerabilities include two or more vulnerabilities having a same priority determined based on the at least two risk values weighted by the at least two coefficients, the determiner gives a highest priority to, among the two or more vulnerabilities, a vulnerability having a highest risk value among risk values each of which is one of the at least two risk values and has been weighted by a highest coefficient among the at least two coefficients.

According to this technique, when there are a plurality of vulnerabilities having the same priority, a highest priority is given to, among the plurality of vulnerabilities, a vulnerability having the highest risk value among risk values each of which has been weighted by the highest coefficient, that is, has the biggest influence.

(Technique 12)

In the priority determination system according to any one of Techniques 1 to 11, each of the at least two risk values has a different one of at least two levels of severity determined in advance, and when the plurality of vulnerabilities include two or more vulnerabilities having a same priority determined based on the at least two risk values, the determiner gives a highest priority to, among the two or more vulnerabilities, a vulnerability having a highest risk value among risk values each of which is one of the at least two risk values and has a highest level of severity among the at least two levels of severity.

According to this technique, when there are a plurality of vulnerabilities having the same priority, a highest priority is given to, among the plurality of vulnerabilities, a vulnerability having the highest risk value among risk values each of which has the highest level of severity.

(Technique 13)

In the priority determination system according to any one of Techniques 2 to 11, the one or more vulnerabilities are a plurality of vulnerabilities when a total number of the one or more vulnerabilities is plural, the plurality of vulnerabilities each being the vulnerability, each of the at least two risk values has a different one of at least two levels of severity determined in advance, and, when the plurality of vulnerabilities include two or more vulnerabilities having a same priority determined based on the at least two risk values, the determiner gives a highest priority to, among the two or more vulnerabilities, a vulnerability having a highest risk value among risk values each of which is one of the at least two risk values and has a highest level of severity among the at least two levels of severity.

According to this technique, when there are a plurality of vulnerabilities having the same priority, a highest priority is given to, among the plurality of vulnerabilities, a vulnerability having the highest risk value among risk values each of which has the highest level of severity.

(Technique 14)

In the priority determination system according to any one of Techniques 1 to 13, the calculator calculates the at least two risk values for the ECU on which the vulnerability has influence, the ECU being one ECU, and the determiner determines the priority of the countermeasure for the ECU on which the vulnerability has influence.

According to this technique, a priority of a countermeasure for one ECU on which a vulnerability has influence can be determined.

(Technique 15)

In the priority determination system according to any one of Techniques 1 to 13, the calculator calculates the at least two risk values for a combination of the ECU on which the vulnerability has influence and the vehicle type equipped with the ECU, the ECU being one ECU, the vehicle type being one vehicle type, and the determiner determines the priority of the countermeasure for the combination on which the vulnerability has influence.

According to this technique, a priority of a countermeasure for a combination of one ECU on which a vulnerability has influence and one vehicle type equipped with the ECU can be determined.

(Technique 16)

A priority determination method that is performed by a priority determination system. The priority determination method includes: obtaining information indicating a vulnerability related to an electronic control unit (ECU); extracting an ECU on which the vulnerability has influence; calculating at least two risk values among an ECU risk value indicating a level of risk of a threat to the ECU caused by the vulnerability, a vehicle type risk value indicating a level of risk to a vehicle type equipped with the ECU to which the threat is caused by the vulnerability, and a spread risk value indicating a level of risk when the threat caused by the vulnerability is spread to the vehicle type; determining, based on the at least two risk values, a priority of a countermeasure for the vulnerability; and outputting the priority determined for each of a plurality of vulnerabilities, the plurality of vulnerabilities each being the vulnerability.

According to this technique, a priority determination system that can determine a priority of a countermeasure for a vehicle vulnerability can be provided.

(Technique 17)

A priority determination method that is performed by a priority determination system. The priority determination method includes: obtaining information indicating a vulnerability related to an electronic control unit (ECU) and an ECU on which the vulnerability has influence; calculating at least two risk values among an ECU risk value indicating a level of risk to the ECU on which the vulnerability has influence, a vehicle type risk value indicating a level of risk to a vehicle type equipped with the ECU on which the vulnerability has influence, and a spread risk value indicating a level of risk when a threat caused by the vulnerability is spread to the vehicle type; determining, based on the at least two risk values, a priority of a countermeasure for the vulnerability; and outputting the priority determined for each of one or more vulnerabilities, the one or more vulnerabilities each being the vulnerability.

According to this technique, a priority determination system that can determine a priority of a countermeasure for a vehicle vulnerability can be provided.

Further Information about Technical Background to this Application

The disclosures of the following patent applications including specification, drawings, and claims are incorporated herein by reference in their entirety: Japanese Patent Application No. 2023-208617 filed on Dec. 11, 2023, Japanese Patent Application No. 2024-131858 filed on Aug. 8, 2024.

INDUSTRIAL APPLICABILITY

The present disclosure is applicable to a system for performing a countermeasure for a vulnerability, or the like.

The invention claimed is:

1. A priority determination system, comprising:
a processor; and
a memory including a program that, when executed by the processor, causes the processor to:
obtain information indicating a vulnerability related to an electronic control unit (ECU);
extract the ECU on which the vulnerability has influence;
calculate at least two risk values among an ECU risk value indicating a level of risk of a threat to the ECU caused by the vulnerability, a vehicle type risk value indicating a level of risk to a vehicle type equipped with the ECU to which the threat is caused by the vulnerability, and a spread risk value indicating a level of risk when the threat caused by the vulnerability is spread to the vehicle type;
determine, based on the at least two risk values, a priority of a countermeasure for the vulnerability; and
output the priority determined for each of a plurality of vulnerabilities, the plurality of vulnerabilities each being the vulnerability,
wherein the processor further calculates anticipated damage when the threat occurs or a response time required for responding to the threat, based on vehicle type management-related information, and calculates the spread risk value based on the anticipated damage or the response time.

2. A priority determination system, comprising:
a processor; and
a memory including a program that, when executed by the processor, causes the processor to:
obtain information indicating a vulnerability related to a first electronic control unit (ECU) and a second ECU on which the vulnerability has influence;
calculate at least two risk values among an ECU risk value indicating a level of risk to the second ECU on which the vulnerability has influence, a vehicle type risk value indicating a level of risk to a vehicle type equipped with the second ECU on which the vulnerability has influence, and a spread risk value indicating a level of risk when a threat caused by the vulnerability is spread to the vehicle type;
determine, based on the at least two risk values, a priority of a countermeasure for the vulnerability; and
output the priority determined for each of one or more vulnerabilities, the one or more vulnerabilities each being the vulnerability,
wherein the processor further calculates anticipated damage when the threat occurs or a response time required for responding to the threat, based on vehicle type management-related information, and calculates the spread risk value based on the anticipated damage or the response time.

3. The priority determination system according to claim 1, wherein
the vehicle type management-related information includes a total number of vehicles of the vehicle type shipped or a response difficulty of the vehicle type.

4. The priority determination system according to claim 3, wherein
the total number of vehicles shipped is a total number of vehicles of the vehicle type shipped on a country basis or an area basis.

5. The priority determination system according to claim 3, wherein
the total number of vehicles shipped is a total number of vehicles in operation among vehicles of the vehicle type shipped.

6. The priority determination system according to claim 1, wherein
the processor calculates the ECU risk value or the vehicle type risk value, based on a method that is in conformity with a standard.

7. The priority determination system according to claim 1, wherein
the processor determines at least two coefficients each of which is for weighting a different one of the at least two risk values, and determines, based on the at least two risk values weighted by the at least two coefficients, the priority of the countermeasure for the vulnerability.

8. The priority determination system according to claim 2, wherein
the processor determines at least two coefficients each of which is for weighting a different one of the at least two risk values, and determines, based on the at least two risk values weighted by the at least two coefficients, the priority of the countermeasure for the vulnerability.

9. The priority determination system according to claim 8, wherein the one or more vulnerabilities are a plurality of vulnerabilities when a total number of the one or more vulnerabilities is plural, the plurality of vulnerabilities each being the vulnerability.

10. The priority determination system according to claim 7, wherein when the plurality of vulnerabilities include two or more vulnerabilities having a same priority determined based on the at least two risk values weighted by the at least two coefficients, the processor gives a highest priority to, among the two or more vulnerabilities, a vulnerability having a highest risk value among risk values each of which is one of the at least two risk values and has been weighted by a highest coefficient among the at least two coefficients.

11. The priority determination system according to claim 1, wherein each of the at least two risk values has a different one of at least two levels of severity determined in advance, and when the plurality of vulnerabilities include two or more vulnerabilities having a same priority determined based on the at least two risk values, the processor gives a highest priority to, among the two or more vulnerabilities, a vulnerability having a highest risk value among risk values each of which is one of the at least two risk values and has a highest level of severity among the at least two levels of severity.

12. The priority determination system according to claim 2, wherein the one or more vulnerabilities are a plurality of vulnerabilities when a total number of the one or more vulnerabilities is plural, the plurality of vulnerabilities each being the vulnerability, each of the at least two risk values has a different one of at least two levels of severity determined in advance, and when the plurality of vulnerabilities include two or more vulnerabilities having a same priority determined based on the at least two risk values, the processor gives a highest priority to, among the two or more vulnerabilities, a vulnerability having a highest risk value among risk values each of which is one of the at least two risk values and has a highest level of severity among the at least two levels of severity.

13. The priority determination system according to claim 1, wherein the processor calculates the at least two risk values for the ECU on which the vulnerability has influence, the ECU being one ECU, and the processor determines the priority of the countermeasure for the ECU on which the vulnerability has influence.

14. The priority determination system according to claim 1, wherein the processor calculates the at least two risk values for a combination of the ECU on which the vulnerability has influence and the vehicle type equipped with the ECU, the ECU being one ECU, the vehicle type being one vehicle type, and the processor determines the priority of the countermeasure for the combination on which the vulnerability has influence.

15. A priority determination method that is performed by a priority determination system, the priority determination method comprising:

obtaining information indicating a vulnerability related to an electronic control unit (ECU);

extracting the ECU on which the vulnerability has influence;

calculating at least two risk values among an ECU risk value indicating a level of risk of a threat to the ECU caused by the vulnerability, a vehicle type risk value indicating a level of risk to a vehicle type equipped with the ECU to which the threat is caused by the vulnerability, and a spread risk value indicating a level of risk when the threat caused by the vulnerability is spread to the vehicle type;

determining, based on the at least two risk values, a priority of a countermeasure for the vulnerability; and outputting the priority determined for each of a plurality of vulnerabilities, the plurality of vulnerabilities each being the vulnerability, wherein the priority determination method further comprises:

calculating anticipated damage when the threat occurs or a response time required for responding to the threat, based on vehicle type management-related information, and calculating the spread risk value based on the anticipated damage or the response time.

16. A priority determination method that is performed by a priority determination system, the priority determination method comprising:

obtaining information indicating a vulnerability related to a first electronic control unit (ECU) and a second ECU on which the vulnerability has influence;

calculating at least two risk values among an ECU risk value indicating a level of risk to the second ECU on which the vulnerability has influence, a vehicle type risk value indicating a level of risk to a vehicle type equipped with the second ECU on which the vulnerability has influence, and a spread risk value indicating a level of risk when a threat caused by the vulnerability is spread to the vehicle type;

determining, based on the at least two risk values, a priority of a countermeasure for the vulnerability; and outputting the priority determined for each of one or more vulnerabilities, the one or more vulnerabilities each being the vulnerability, wherein the priority determination method further comprises:

calculating anticipated damage when the threat occurs or a response time required for responding to the threat, based on vehicle type management-related information, and calculating the spread risk value based on the anticipated damage or the response time.

* * * * *